Dec. 15, 1959     J. J. MAHADY     2,917,102
METHOD OF MAKING HOSE WITH SEALING RINGS ATTACHED AT EACH END
Filed Feb. 25, 1955     2 Sheets-Sheet 1
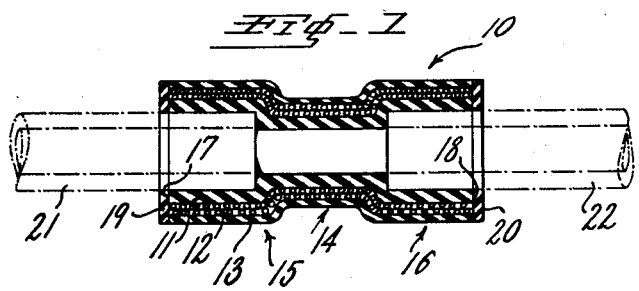
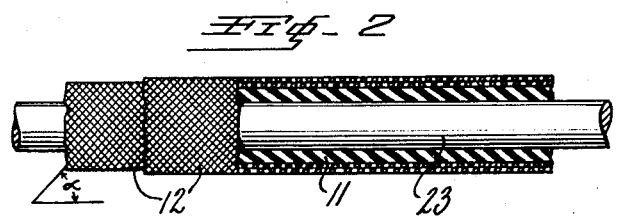
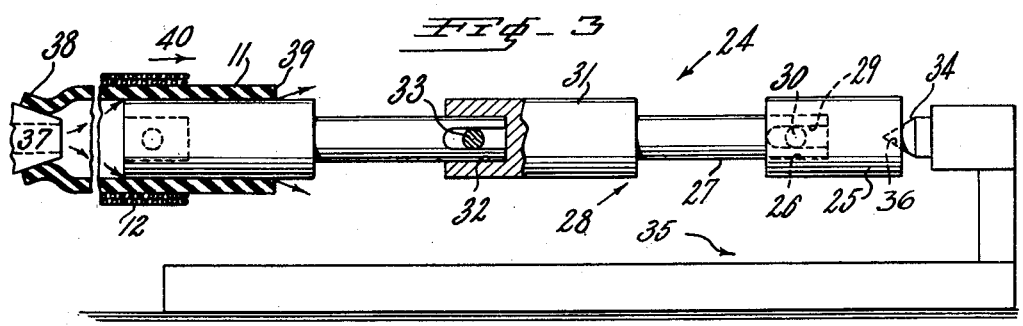
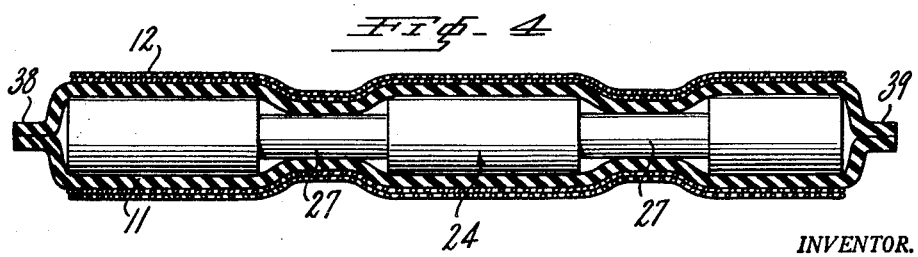
INVENTOR.
JOHN J. MAHADY
BY
ATTORNEY Dec. 15, 1959    J. J. MAHADY    2,917,102
METHOD OF MAKING HOSE WITH SEALING RINGS ATTACHED AT EACH END
Filed Feb. 25, 1955    2 Sheets-Sheet 2
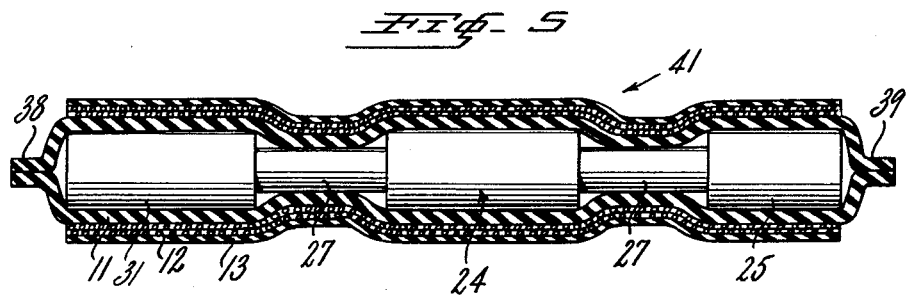
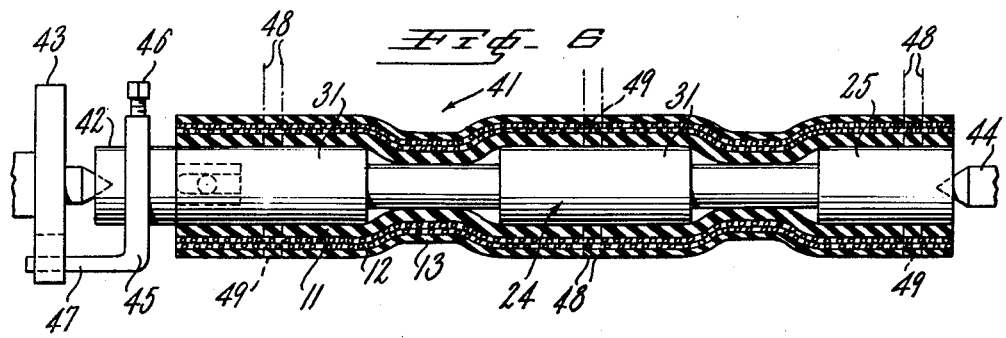
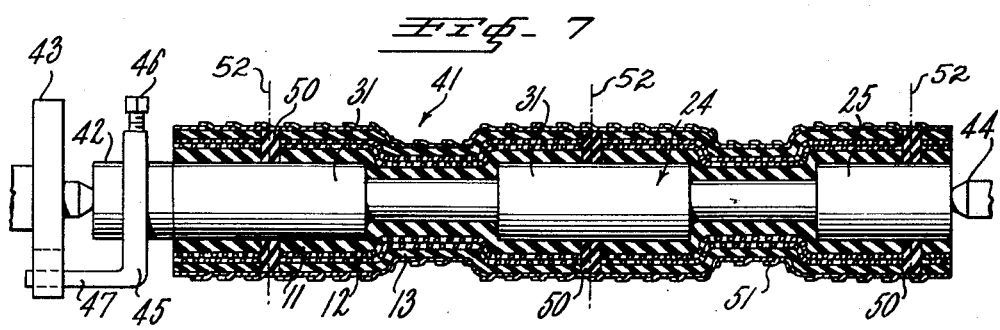
INVENTOR.
JOHN J. MAHADY
BY
ATTORNEY

United States Patent Office 2,917,102
Patented Dec. 15, 1959

2,917,102

METHOD OF MAKING HOSE WITH SEALING RINGS ATTACHED AT EACH END

John J. Mahady, Hackensack, N.J., assignor to United States Rubber Company, New York, N.Y., a corporation of New Jersey Application February 25, 1955, Serial No. 490,488

6 Claims. (Cl. 154—8)

This invention relates to the manufacture of an improved pinch valve hose.

In the prior art, the type of hose with which this invention is concerned is ordinarily made by wrapping fabric reinforcement around an inner rubber tube by hand, after which the outer rubber jacket is applied. However, the present invention departs from such procedure in mechanically applying such fabric reinforcement by braiding it over the inner tube, and thus has the following advantages. First, the use of a braided construction permits several valve bodies to be braided in one pass of the braider, thereby producing a decided improvement in uniformity of build-up and effecting a substantial savings in labor, material and time over conventional methods of fabric build-up by hand. Furthermore, as compared to hand wrapped fabric reinforcement the use of braid produces a more flexible valve with a corresponding increase in service life and permits a wider range of reinforcing materials for a higher strength in special applications.

A primary object of the invention therefore, is to obtain high strength and flexibility in a pinch valve hose having braided reinforcement.

A principal object is to manufacture a pinch valve hose having sealing rings securely attached at each end to prevent undesirable wear and fluid infiltration.

An important object of the invention is to manufacture pinch valve hose having a central reduced portion and enlarged end portions.

Another object is to manufacture a pinch valve hose having a uniformly assembled built-up layer construction.

A further object of the invention is to manufacture a pinch valve hose having a central bore of the same size as the openings of the conduits connected thereby to prevent undesirable fluid friction in said valve.

The above and other objects and advantages of the invention will become fully apparent from the following specification when read in connection with the accompanying drawings and will be pointed out with particularity in the appended claims.

In the drawings:

Fig. 1 is a longitudinal sectional view of the pinch valve hose of the invention and also illustrates in phantom the pipes connected thereby;

Fig. 2 is a longitudinal sectional view of the inner rubber tube having braided reinforcements;

Fig. 3 is a longitudinal elevational view partly in section, illustrating the manner in which the braided tube is mounted on the mandrel;

Fig. 4 is a longitudinal elevational view partly in section, illustrating the tube completely mounted on the mandrel and having its extending ends sealed;

Fig. 5 is a longitudinal elevational view partly in section, illustrating the reinforced tube after the same has been covered with an outer jacket to form a hose assembly;

Fig. 6 is a view similar to Fig. 5 but also shows the hose assembly mounted on a lathe for the formation of the sealing rings; and Fig. 7 is a longitudinal sectional view of the wrapped hose assembly prior to the final step in the formation of the sealing rings.

Referring now to Fig. 1, the pinch valve hose 10 comprises an assembly of an inner lining tube 11 of rubber, two intermediate layers of braided cotton reinforcement 12 and an outer rubber jacket 13. It is apparent that the braid provides a very strong though flexible reinforcement, thereby increasing the service life of the hose. This assembly has a central reduced portion 14 and enlarged end portions 15 and 16. The end portions have annular end faces 17 and 18 to which are securely bonded rubber sealing rings 19 and 20. It is further apparent that the rings are the same diametral shape as the end portions and thus fit flush against the end faces. By diametral shape is meant that the rings have substantially the same inner and outer diameter as the assembly. This construction positively seals the end faces against undesirable wear and fluid infiltration tending to separate and break down the built-up layer construction of the hose.

The hose is adapted to connect pipes 21 and 22 and the reduced central portion 14 is adapted to be pinched together to close off the flow of fluid from one pipe to the other. It will readily be seen that the bore of the central portion 14 is reduced to be smaller than the bores of the enlarged portions and to be the same size as the bores of the pipes 21 and 22 whereby undesirable friction in fluid flow through the valve is prevented. Further, the bores of the end portions are enlarged to snugly fit the exterior of said pipes.

The manner in which the hose is manufactured is illustrated in Figs. 2 to 7. Referring to Fig. 2, the inner tube 11 is formed from a long extruded tube of vulcanizable rubber which is slipped over mandrel 23 having a diameter substantially equal to the inner diameters of the reduced portion 14 and pipes 21 and 22. The mounted tube is then passed through a braider (not shown) whereby one or more layers 12 of braided reinforcement are mechanically applied thereto in a conventional manner. The strands of the braid make an angle alpha (ranging from 30 to 45°) with the tube axis to allow the braid to expand or contract easily.

Referring now to Fig. 3, the multiple section mandrel 24 comprises an end section in the form of an enlarged cylindrical head 25, which is provided with a cylindrical recess 26 into which the reduced stem 27 of the adjacent section 28 of the mandrel 24 is adapted to fit. The stem 27 is provided with a slot 29, which fits over a pin 30 passing through the end section 25. The purpose of the pin 30 is to prevent the mandrel section 28 from turning with respect to the section 25. The enlarged head 31 of the section 28 is provided with a cylindrical recess 32 and pin 33 similar to the recess 26 and pin 30 in the end section 25. A series of such mandrel sections 28 are fitted together by extending the stem of one into the head of the other.

After the desired number of mandrel sections have been so built-up, the end section 25 is fitted against a stationary supporting pin 34 in fixture 35 which extends into a recess 36 in the end section 25 of the mandrel. The opposite end of the built-up mandrel 24 is held by the operator, and the tube 11 with reinforcement 12 (having been removed from mandrel 23), is slipped over that end of the mandrel 24 under tension by placing an air nozzle 37 into the end 38 of the tube 11 to expand the tube and the braided reinforcement 12. While air is being blown through the tube (as shown by the diverging arrows in Fig. 3) the opposite end 39 of said tube rides over the mandrel from left to right as indicated by the arrow 40.

After the end 39 of the tube 11 is passed over the stationary holding pin 34 in the fixture 35, the nozzle 37 is removed from the tube 11 and the extended end 38 of the tube is pinched together as shown in Fig. 4. The operator continues to push the sections of the mandrel against the holding pin 34 until he is able to grasp the extended end 39 of the tube 11. He then removes the end section 25 from the supporting pin 34, and pinches the end 39 of the tube 11 together so as to hold the sections of the mandrel 24 together. As is apparent, after the tensioning air is released the tube 11 and reinforcement 12 contract and draw down over the mandrel stems 27 to partly form the central reduced portion 14 of the complete hose 10. The bore diameter of reduced portion 14 is controlled by the stems 27 of the mandrel 24 which are substantially the same as the diameter of the mandrel 23. As stated above, the bore can thus be made the same size as the bores of the pipes 21, 22 to be connected by the hose 10 and the braid 12 provides a flexible but strong reinforcement.

As shown in Fig. 5, the outer, uncured rubber jacket 13 is then placed over the braided layers 12 in the same manner that the tube 11 was slipped over the mandrel 24, except that the use of the fixture 35 containing the holding pin 34 is not required because the sections of the mandrel 24 are held together by the inner rubber tube 11 and the braided layers 12. The outer jacket 13 is expanded under tension to fit over the braid 12 by use of the air, and when the air is released the outer jacket 13 contracts and draws down over said braided layers 12 and stems 27. The above procedure results in a hose assembly 41 of a uniformly built-up layer construction. It is apparent that any desired number of layers of braid or rubber jackets may be applied, either successively or alternatively, to form said built-up hose assembly.

At this stage, the sections of the mandrel 24 are held together by the various layers 11, 12, 13 placed thereon, and the ends 38 and 39 of the tube 11 are cut off. As shown in Fig. 6, a second end section 42 is inserted in the bore in the head of the last section of the mandrel 24, and the mandrel with the built-up hose assembly 41 thereon is placed in a lathe having a revolving head 43 and tail stock 44. The mandrel 24 is revolved by a dog 45 which is clamped by the screw 46 to the end piece 42, and the dog tail 47 fits into the revolving head 43 of the lathe. The assembled mandrel 24 comprises only two intermediate sections 28, and is adapted to make two pinch valve hoses, one for each section. It is obvious, however, that any number of hoses can be made by selecting the proper number of mandrel sections 28.

The next operation is to cut the hose assembly 41 on the mandrel into the individual pinch valve hoses 10 and to seal the cut ends of each hose with the rubber rings 19 and 20, as shown in Fig. 1. These operations are carried out while the mandrel is in the lathe, as shown in Fig. 6. The portions of the hose assembly 41 overlying each head 25, 31 are cut, as indicated by the dot-and-dash lines 48, thereby forming annuli 49. These portions are slit axially and then removed, leaving channels in said hose assembly between the dot-and-dash lines 48.

These channels are filled with uncured rubber rings 50, as shown in Fig. 7. The uncured rubber rings 50 may be formed from thin ribbons of rubber which may be wrapped around the mandrel heads 25, 31 in the channels while the mandrel 24 is rotated. The hose assembly is then wrapped, as illustrated in Fig. 7, with tape 51 from one end to the other while the mandrel 24 is being rotated. The spiral wrap thus formed places the mounted hose assembly 41 under compression, and causes the assembly to draw down tightly on the mandrel stems, thus completing the formation of the bore of the central reduced portion 14. The hose assembly 41 is then taken from the lathe and placed in a vulcanizer (not shown) where said assembly is cured to form an integral structure.

The assembly 41 is placed back in the lathe, and after removing the tape 51, the rings 50 are divided circumferentially by cutting through the center of said rings with a knife, as indicated by the dot-and-dash lines 52 in Fig. 7, while the mandrel is being rotated. This cutting produces the sealing rings 19 and 20 of rubber on each end of the pinch valve hose 10, as shown in Fig. 1. The mandrel 24 and hose assembly 41 are then taken from the lathe, and the completed hoses 10, each having the sealing rings 19, 20 securely bonded thereto, may be easily separated from the assembly and removed from the mandrel. It will readily be seen that the above procedure constitutes both a novel and unique way of forming and securing the sealing rings to the hose.

It is to be understood that the term "rubber" as used herein includes natural and synthetic rubber, and that other braidable materials such as nylon, rayon and the like may be substituted for cotton in the braided reinforcement. Moreover, while the invention herein illustrated has been described by reference to specific forms thereof, it is to be understood that various changes and modifications may be made therein by those skilled in the art without departing from the spirit of the invention as defined in the appended claims.

Having thus described my invention, what I claim and desire to protect by Letters Patent is:

1. The method of making a hose having sealing rings at each end which comprises forming an assembly by providing a curable rubber tube having at least one layer of fabric reinforcement on the outer surface thereof, mounting said tube over a mandrel, and applying an outer curable rubber jacket over said tube, removing annuli from said assembly and substituting therefor rings, having substantially the same inner and outer diameter as said annuli and consisting of curable rubber, to seal the ends of the assembly exposed by the removal of said annuli against wear and fluid infiltration tending to separate the layer construction of the hose, and curing said assembly and said rings to form an integral structure.

2. The method of making a hose having sealing rings at each end which comprises forming an assembly by providing a curable rubber tube having at least one layer of fabric reinforcement on the outer surface thereof, mounting said tube over a mandrel, and applying an outer curable rubber jacket over said tube, removing annuli from said assembly and substituting therefor rings, having substantially the same inner and outer diameter as said annuli and consisting of curable rubber, to seal the ends of the assembly exposed by the removal of said annuli against wear and fluid infiltration tending to separate the layer construction of the hose, curing said assembly and said rings to form an integral structure, and dividing said rings circumferentially by radially cutting the same to complete said hose.

3. The method of making a flexible pinch valve hose having sealing rings at each end which comprises forming an assembly by providing a curable rubber tube having at least one layer of fabric reinforcement on the outer surface thereof, mounting said tube under circumferential tension over a mandrel having enlarged heads and at least one reduced stem, removing said tension to draw said tube down over said stem, and applying an outer curable rubber jacket over said tube, removing annuli from the portions of said assembly overlying said heads and substituting therefor rings, having substantially the same inner and outer diameter as said annuli and consisting of curable rubber, to seal the ends of the assembly exposed by the removal of said annuli against wear and fluid infiltration tending to separate the layer construction of the hose, and curing said assembly and said rings to form an integral structure.

4. The method of making a flexible pinch valve hose having sealing rings at each end which comprises forming an assembly by providing a curable rubber tube having at least one layer of fabric reinforcement on the outer surface thereof, mounting said tube under circumferential tension over a mandrel having enlarged heads and at least one reduced stem, removing said tension to draw said tube down over said stem, and applying an outer curable rubber jacket over said tube, removing annuli from the portions of said assembly overlying said heads and substituting therefor rings, having substantially the same inner and outer diameter as said annuli and consisting of curable rubber, to seal the ends of the assembly exposed by the removal of said annuli against wear and fluid infiltration tending to separate the layer construction of the hose, curing said assembly and said rings to form an integral structure, and dividing said rings circumferentially by radially cutting the same to complete said hose.

5. The method of making a flexible pinch valve hose having sealing rings at each end which comprises forming an assembly by providing a rubber tube having at least one layer of braided reinforcement, mounting said rubber tube under tension over a mandrel having enlarged heads and at least one reduced stem, removing said tension to draw said tube down over said stem, applying an outer rubber jacket under tension and removing said tension to draw said jacket down over said tube and stem, cutting annuli in the portions of said assembly overlying said heads, removing said annuli to leave channels in said assembly, substituting curable rubber rings for said annuli by wrapping thin rubber ribbons around said mandrel to fill said channels and to seal the ends of the assembly exposed by the removal of said annuli, curing said assembly and said rings to form an integral structure, and dividing said rings circumferentially to complete said hose.

6. The method of making a flexible pinch valve hose having sealing rings at each end which comprises forming an assembly by providing a rubber tube having at least one layer of braided reinforcement, mounting said tube under tension over a mandrel having enlarged heads and at least one reduced stem, removing said tension to draw said tube down over said stem, applying an outer rubber jacket under tension and removing said tension to draw said jacket down over said tube and stem, cutting annuli in the portions of said assembly overlying said heads, removing said annuli to leave channels in said assembly, substituting curable rubber rings for said annuli by wrapping thin rubber ribbons around said mandrel to fill said channels and to seal the ends of the assembly exposed by the removal of said annuli, wrapping said assembly with tape to place it under compression and to draw it down tightly over said stem, vulcanizing said assembly and said rings to form an integral structure, removing said tape and dividing said rings circumferentially by cutting to complete said hose.

References Cited in the file of this patent

UNITED STATES PATENTS

| | | |
|---|---|---|
| 1,756,698 | Oden | Apr. 29, 1930 |
| 1,974,211 | Freeman et al. | Sept. 18, 1934 |
| 2,009,075 | Thompson | July 23, 1935 |
| 2,451,791 | Weaver | Oct. 19, 1948 |
| 2,652,093 | Burton | Sept. 15, 1953 |
| 2,690,769 | Brown | Oct. 5, 1954 |
| 2,693,223 | Krupp | Nov. 2, 1954 |
| 2,713,885 | McKinley | July 26, 1955 |
| 2,757,690 | Young | Aug. 7, 1956 |
| 2,785,382 | Lamb | Mar. 12, 1957 |

FOREIGN PATENTS

| | | |
|---|---|---|
| 627,278 | Great Britain | Aug. 4, 1949 |
| 648,562 | Great Britain | Jan. 10, 1951 |
| 811,132 | France | Jan. 14, 1937 |